(12) United States Patent
Taniguchi et al.

(10) Patent No.: US 11,273,621 B2
(45) Date of Patent: Mar. 15, 2022

(54) LAMINATED FOAM SHEET (71) Applicant: JSP CORPORATION, Tokyo (JP)

(72) Inventors: Ryuichi Taniguchi, Tochigi (JP);
Hirotoshi Kakuta, Utsunomiya (JP)

(73) Assignee: JSP CORPORATION, Tokyo (JP)

( * ) Notice: Subject to any disclaimer, the term of this patent is extended or adjusted under 35 U.S.C. 154(b) by 47 days.

(21) Appl. No.: 16/731,302

(22) Filed: Dec. 31, 2019

(65) Prior Publication Data
US 2020/0269542 A1 Aug. 27, 2020

(30) Foreign Application Priority Data
Feb. 27, 2019 (JP) .................. JP2019-33864

(51) Int. Cl.
*B32B 5/18* (2006.01)
*B32B 27/08* (2006.01)
*B32B 27/32* (2006.01)

(52) U.S. Cl.
CPC ............... *B32B 5/18* (2013.01); *B32B 27/08* (2013.01); *B32B 27/32* (2013.01); *B32B 2305/022* (2013.01); *B32B 2307/718* (2013.01); *B32B 2307/72* (2013.01); *B32B 2323/046* (2013.01)

(58) Field of Classification Search
CPC ........ B32B 2250/242; B32B 2266/025; B32B 2323/046; B32B 27/32; B32B 27/08; B32B 27/065; B32B 2307/21; B32B 2307/718
See application file for complete search history.

(56) References Cited

U.S. PATENT DOCUMENTS

| 2008/0213607 A1* | 9/2008 | Morita ................ B32B 27/365 428/515 |
| 2015/0224745 A1* | 8/2015 | Morita ................ B32B 27/08 428/219 |
| 2016/0137804 A1* | 5/2016 | Van der Ven ........... C08J 9/14 428/318.6 |

FOREIGN PATENT DOCUMENTS

| JP | 2004181933 A1 | 7/2004 |
| JP | 2005074771 A1 | 3/2005 |
| JP | 2010042598 | 2/2010 |
| JP | 2019042988 A | 3/2019 |
| WO | 2014202605 A1 | 12/2014 |

OTHER PUBLICATIONS

European Search Report in corresponding European Application No. 20000010, dated Jul. 13, 2020.

* cited by examiner

*Primary Examiner* — Alicia J Sawdon

(74) *Attorney, Agent, or Firm* — Bacon & Thomas, PLLC (57) ABSTRACT

A laminated foam sheet having a polyethylene resin foam layer and an outer layer laminated on each side of the foam layer, each outer layer being composed of an outermost surface polyethylene resin layer and an intermediate polyethylene resin layer which is positioned between the outermost surface layer and the foam layer and which contains a specific amount of a polymeric antistatic agent relative to the weight of the intermediate layer and to the basis weight of each of the intermediate layer and outermost surface layer.

6 Claims, 1 Drawing Sheet

LAMINATED FOAM SHEET

BACKGROUND OF THE INVENTION

The present invention relates generally to a laminated foam sheet and, more specifically, to an antistatic laminated foam sheet useful as, for example, an interleaf sheet and a packaging sheet for electronic devices and glasses.

A polyethylene-based resin foam sheet, which is soft and flexible and has good cushioning property, is used as a cushioning material and a packaging material. Because such a foam sheet is apt to generate static electricity and cause dust deposition problems by static electricity, however, antistatic property must be imparted thereto. In the past, an antistatic agent such as a surfactant was used to obviate the static electricity problems. Such a foam sheet containing a surfactant-type antistatic agent, however, has been found to cause another problem of bleeding out of the antistatic agent and staining of a surface of an article in contact with the foam sheet.

To cope with the above problem, Japanese patent publication Nos. JP-A-2004-181933 and JP-A-2005-74771 each propose a laminated foam sheet having a polyolefin foam layer and a polyolefin resin surface layer laminated on the foam layer and containing a polymeric antistatic agent. With these laminated foam sheets, it is expected that bleeding out of the polymeric antistatic agent to an article in contact therewith will not occur. In fact, as compared with the conventional foam sheet using a surfactant-type antistatic agent, these laminated foam sheets show both good antistatic property and improved surface staining prevention effect.

In the field of, for example, electronic devices and glasses for liquid crystal panels, there is a strong demand for a packaging sheet which shows good cushioning property, excellent antistatic property and, yet, much improved property to prevent an article to be packaged or wrapped with the sheet from being stained with chemical components contained therein. In this regard, it has been found that, with the above-described known laminated foam sheets containing a polymeric antistatic agent, low molecular weight matters trace contained in the polymeric surfactant transfer to a surface of an article that is in contact with the foam sheets.

The present invention is aimed at provision of a laminated foam sheet which shows excellent antistatic property and yet has excellent transference prevention property.

SUMMARY OF THE INVENTION

In accordance with the present invention there are provided the following laminated foam sheets:

[1] A laminated foam sheet comprising:

a foam layer of a base polymer including a polyethylene-based resin PE-2, and an outer layer laminated on each of both sides of the foam layer, each of the outer layers having a multi-layer structure comprising an outermost surface layer containing a polyethylene-based resin PE-4 and an intermediate layer containing a polyethylene-based resin PE-3 and positioned between the outermost surface layer and the foam layer, the outermost surface layer and the intermediate layer of each of the outer layers being laminated together by coextrusion, the outermost surface layer of each of the outer layers being substantially free of a polymeric antistatic agent and having a basis weight B [g/m$^2$], the intermediate layer of each of the outer layers containing a polymeric antistatic agent in an amount of 10 to 30% by weight based on the total weight of the polyethylene-based resin PE-3 and the polymeric antistatic agent, wherein the polymeric antistatic agent is contained in the intermediate layer of each of the outer layers in an amount A [g/m$^2$] that is 0.2 to 2 g per 1 m$^2$ of the intermediate layer, and wherein, in each of the outer layers, a ratio B/A of the basis weight B [g/m$^2$] of the outermost surface layer to the amount A [g/m$^2$] of the polymeric antistatic agent is 1 to 30.

[2] The laminated foam sheet according to above [1], wherein the basis weight B [g/m$^2$] of the outermost surface layer of each of the outer layers is 0.5 to 10 g/m$^2$.

[3] The laminated foam sheet according to above [1] or [2], wherein the intermediate layer of each of the outer layers has a basis weight C [g/m$^2$] of 1 to 10 g/m$^2$.

[4] The laminated foam sheet according to any one of above [1] to [3], which has a surface resistivity of $1 \times 10^{13} \Omega$ or less.

[5] The laminated foam sheet according to any one of above [1] to [4], wherein the polyethylene-based resin PE-4 of the outermost surface layer of each of the outer layers is linear low-density polyethylene.

[6] The laminated foam sheet according to any one of above [1] to [5], wherein the polyethylene-based resin PE-3 of the intermediate layer of each of the outer layers is linear low-density polyethylene.

BRIEF DESCRIPTION OF THE DRAWING

Other objects, features and advantages of the present invention will become apparent from the detailed description of the preferred embodiments of the invention which follows, when considered in light of the accompanying drawings in which.

DETAILED DESCRIPTION OF THE INVENTION

Figure 1:
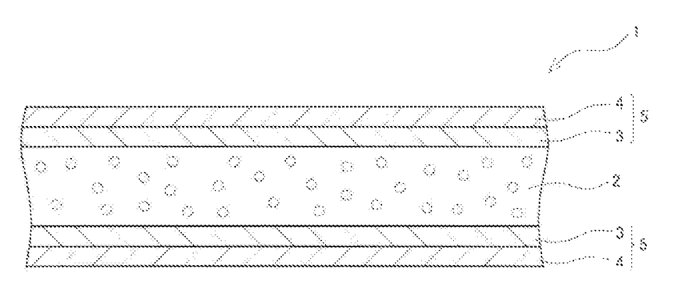
FIG. 1 is a schematic cross-sectional view illustrating an embodiment of a laminated foam sheet according to the present invention.

Referring to FIG. 1, the reference numeral 1 generally designates a laminated foam sheet embodying the present invention. The laminated foam sheet 1 has a foam layer 2 formed of a base polymer containing a polyethylene-based resin and a pair of outer layers 5 laminated on both sides thereof.

Each of the two outer layers 5 has a multi-layer structure including an outermost surface polyethylene-based resin layer 4 and an intermediate polyethylene-based resin layer 3 positioned between the outermost surface layer 4 and the foam layer 2. If desired, each of the outer layer 5 may additionally have one or more polyethylene-based resin layers (not shown) between the intermediate layer 3 and the foam layer 2. Such an additional layer or layers have a composition similar to that of the outermost surface layer 4.

It is important that the outermost surface layer 4 and the intermediate layer 3 of each of the outer layers 5 are laminated together by coextrusion. It is also essential that the outermost surface layer 4 of each of the outer layers 5 is substantially free of a polymeric antistatic agent, while the intermediate layer 3 of each of the outer layers 5 contains a polymeric antistatic agent. Additionally, the polymeric antistatic agent should be contained in the intermediate layer 3 of each of the outer layers 5 in a specific percentage amount based on the weight of the intermediate layer 3 and in a specific amount of A [g/m$^2$] per 1 m$^2$ of the intermediate layer 3. Further, in each of the outer layers 5, a ratio B/A of a basis weight B [g/m$^2$] of the outermost surface layer 4 to the amount A [g/m$^2$] of the polymeric antistatic agent should fall within a specific range. The above requirements will be described in detail below.

The following description will be made of one of the two outer layers 5 for the purpose of simplicity. The description also applies to the other outer layer 5.

It should be noted that the two outer layers 5 may have the same or different constitution. For example, the polyethylene-based resin of one of the two outermost surface layers 4 may be the same as or different from that of the other outermost layer 4 and, also, the amount A [g/m$^2$], the basis weight B [g/m$^2$] and/or the ratio B/A in one of the outer layers 5 may be the same as or different from those in the other outer layer 5, as long as the above requirements, which will be described in detail below, are met.

The outermost surface layer 4 and the intermediate layer 3 should be laminated together by coextrusion. The coextrusion lamination method is able to laminate much thinner layers as compared with other lamination methods such as a thermal lamination method. Further, because the coextrusion permits the outermost surface layer 4 and the intermediate layer 3 to be bonded to each other at their whole surfaces, the obtained laminated foam sheet 1 shows good antistatic property in a stable manner. Additionally, the coextrusion lamination method can produce the five-layer laminated foam sheet shown in FIG. 1 in one step.

The polyethylene-based resin used to form the foam layer 2, intermediate layer 3 and outermost surface layer 4 is a resin containing 50 mol % or more of an ethylene component. Specific examples include low-density polyethylene (PE-LD), linear low-density polyethylene (PE-LLD), high-density polyethylene (PE-HD), an ethylene-vinyl acetate copolymer (EVAC), an ethylene-methyl methacrylate copolymer (EMMA) and an ethylene-ethyl acrylate copolymer (EEA). In general, low-density polyethylene is a polyethylene-based resin having a long-chain branched structure and having a density of 910 kg/m$^3$ or higher and lower than 930 kg/m$^3$. Linear low-density polyethylene is a copolymer of ethylene and a C$_4$ to C$_8$ α-olefin and is a polyethylene-based resin having a substantially linear molecular chain and having a density of 910 kg/m$^3$ or higher and lower than 930 kg/m$^3$. High-density polyethylene is a polyethylene-based resin having a density of 930 kg/m$^3$ or higher.

The foam layer 2 is formed of a base polymer containing the polyethylene-based resin PE-2. The term "base polymer" as used herein is intended to refer to any polymer or resin that is able to form a foam layer having a multiplicity of cells by an extrusion foaming method. The polyethylene-based resin PE-2 is preferably low-density polyethylene or a mixture of low-density polyethylene and linear low-density polyethylene for reasons of excellent foamability and flexibility. The mixture of low-density polyethylene and linear low-density polyethylene preferably has a linear low-density polyethylene content of 5 to 20% by weight, more preferably 8 to 15% by weight based on the total amount of the low-density polyethylene and linear low-density polyethylene.

The polyethylene-based resin PE-4 that forms the outermost surface layer 4 is preferably linear low-density polyethylene for reasons of reduction of transference of low molecular weight components from the laminated foam sheet 1 to an article that is to be brought into contact therewith. The polyethylene-based resin PE-3 that forms the intermediate layer 3 is also preferably linear low-density polyethylene for reasons of reduction of transference of low molecular weight components.

The base polymer of the foam layer 2 may contain a thermoplastic elastomer and/or a thermoplastic resin in addition to the polyethylene-based resin PE2, if desired. Such an additional polymer is preferably added in an amount of 20% by weight or less, more preferably 10% by weight or less, particularly preferably 5% by weight or less, based on 100% by weight of the base polymer constituting the foam layer 2. The base polymer of the foam layer 2 is preferably substantially free of such an additional polymer.

The intermediate layer 3 contains a polymeric antistatic agent. Examples of the polymeric antistatic agent include polyether, polyether ester amide, block copolymers of polyether and polyolefin and ionomer resins. Suitable block copolymers are those which have a structure in which polyolefin blocks and polyether blocks are alternately linked through a linkage such as an ester linkage, an amide linkage, an ether linkage, a urethane linkage and an imide linkage. The ionomer resin is a polymer containing interchain ionic bonding and may be obtained by copolymerizing ethylene and an unsaturated carboxylic acid, followed by neutralization by metal cations. Examples of the ethylene copolymer include copolymers of ethylene and a carboxylic acid such as acrylic acid, methacrylic acid and maleic acid. Examples of the metal cations include alkali metal cations, alkaline earth metal cations, cations of other main group elements and transition metal cations. A potassium-containing ionomer resin is particularly preferred.

The polymeric antistatic agent preferably has a surface resistivity of $1 \times 10^8$ Ω or less, preferably $5 \times 10^7$ Ω or less.

Specific examples of the polymeric antistatic agent include block copolymers of polyether and polyolefin such as those available from Sanyo Chemical Industries, Ltd. under the trade names of "PELESTAT 300", "PELESTAT 230", "PELESTAT HC250", "PELECTRON PVH", "PELECTRON PVL", "PELECTRON HS" and "PELECTRON LMP", and ionomer resins such as those available from duPont-Mitsui Polychemicals Co., Ltd. under the trade names of "ENTIRA SD100" and "ENTIRA MK400".

The intermediate layer 3 contains a polymeric antistatic agent, while the outermost surface layer 4 is substantially free of a polymeric antistatic agent. Because the outermost surface layer 4, which is to be bought into direct contact with a surface of an article to be wrapped with the laminated foam sheet 1, is substantially free of a polymeric antistatic agent, transference of low molecular weight matters contained in the polymeric antistatic agent to the article surface and the resulting staining thereof may be prevented. As used herein the languages "substantially free of a polymeric antistatic agent" are intended to refer that the amount of the polymeric antistatic agent in the outermost surface layer 4 is 0 to 3% by weight, particularly 0 to 1% by weight, based on 100% by weight of the outermost surface layer 4. It is particularly preferred that the amount of the polymeric antistatic agent in the outermost surface layer 4 is zero (0).

In order to achieve both excellent antistatic property and high degree of transference prevention effect, mere provision of an outermost surface layer on a polymeric antistatic agent-containing intermediate layer is insufficient. It is essential that the amount of the polymeric antistatic agent in the intermediate layer and a ratio of the amount of the polymeric antistatic agent relative to the basis weight of the outermost surface layer should fall within specific ranges as described in detail below.

It is important that the intermediate layer 3 contains a polymeric antistatic agent in an amount of 10 to 30% by weight based on the total amount (100% by weight) of the polyethylene-based resin PE-3 and the polymeric antistatic agent that constitute the intermediate layer 3. When the amount of the polymeric antistatic agent is less than 10% by weight, a desired conductive network structure of the polymeric antistatic agent is failed to be formed in the intermediate layer 3 and, therefore, there is a fear that the laminated foam sheet 1 fails to show excellent antistatic property. For this reason, the amount of the polymeric antistatic agent is preferably 12% by weight or more. Too large an amount of the polymeric antistatic agent in excess of 30% by weight is undesirable because bleeding of low molecular weight matters out from the intermediate layer 3 tends to occur. For this reason, the amount of the polymeric antistatic agent is preferably 25% by weight or less, more preferably 20% by weight or less.

It is also important that the polymeric antistatic agent is contained in the intermediate layer 3 in an amount of A [$g/m^2$] that is 0.2 to 2 g per 1 $m^2$ of the intermediate layer 3. When the amount A of the polymeric antistatic agent is less than 0.2 $g/m^2$, there is a fear that the laminated foam sheet 1 fails to show excellent antistatic property. For this reason, the amount A is preferably 0.3 $g/m^2$ or more, more preferably 0.4 $g/m^2$ or more. When the amount A exceeds 2 $g/m^2$, there is a fear that low molecular weight matters contained in the polymeric antistatic agent tends to bleed out from the intermediate layer 3 to a surface of the outermost surface layer 4. For this reason, the amount A is preferably 1.5 $g/m^2$ or less, more preferably 1.2 $g/m^2$ or less. Incidentally, it is desired that the intermediate layer 3 is in a non-foamed state for reasons of attainment of excellent antistatic property while maintaining the amount A in the above specific range.

It is further important that a ratio B/A of the basis weight B [$g/m^2$] of the outermost surface layer 4 to the amount A [$g/m^2$] of the polymeric antistatic agent in the intermediate layer 3 is 1 to 30 in order to attain both excellent antistatic property and effective prevention of transference of low molecular weight matters from the laminated foam sheet 1 to a surface of an article that is to be brought into contact with the laminated foam sheet 1. When the ratio B/A is higher than 30, the relative amount of the polymeric antistatic agent which is present in the intermediate layer 3 is so small compared to the amount of the polyethylene-based resin of the outermost surface layer 4 which covers the intermediate layer 3 that there is a possibility that the desired antistatic property is not attained. For this reason, the ratio B/A is preferably 25 or less, more preferably 20 or less, still more preferably 15 or less, particularly preferably 10 or less. When the ratio B/A is lower than 1, on the other hand, the relative amount of the polyethylene-based resin of the outermost surface layer 4 which covers the intermediate layer 3 is so small compared to the amount of the polymeric antistatic agent which is present in the intermediate layer 3 that there is a possibility that low molecular weight matters in the polymeric antistatic agent bleeds out into the outermost surface layer 4 and stains a surface of an article that is to be brought into contact with the outermost surface layer 4. For this reason, the ratio B/A is preferably 2 or more, more preferably 3 or more, still more preferably 4 or more.

It is preferred that the outermost surface layer 4 has a basis weight B of 0.5 to 10 $g/m^2$ from the stand of attainment of both good antistatic property and effective prevention of bleeding out of low molecular weight matters. The lower limit of the basis weight B is more preferably 1 $g/m^2$, still more preferably 2 $g/m^2$. The upper limit of the basis weight B is preferably 8 $g/m^2$, still more preferably 6 $g/m^2$. Incidentally, the outermost surface layer 4 may be of a single layer or multi-layer structure. It is without saying that when the outermost surface layer 4 has a multi-layer structure, the basis weight B of the outermost surface layer 4 is the total of those of the multi-layers.

It is also preferred that the intermediate layer 3 has a basis weight C of 1 to 10 $g/m^2$ for reasons of evenness of the antistatic property of the laminated foam sheet 1. In particular, when the basis weight C is 1 $g/m^2$ or more, variation of the antistatic property (surface resistivity) throughout the surface of the laminated foam sheet 1 is minimized. The basis weight C of the intermediate layer 3 is more preferably 2 $g/m^2$ or more. The upper limit of the basis weight C is more preferably 9 $g/m^2$, still more preferably 8 $g/m^2$, for reasons that the laminated foam sheet 1 is able to show good cushioning property and lightness in weight.

It is further preferred that the outer layer 5 has a basis weight of 20 $g/m^2$ or less, more preferably 17 $g/m^2$ or less, still more preferably 15 $g/m^2$ or less, for reasons that the laminated foam sheet 1 is able to show good cushioning property and lightness in weight and that the foam layer 2 is able to have a good cell structure when laminated with the outer layer 5 (intermediate layer 3 and outermost surface layer 4) by coextrusion. The lower limit of the basis weight of the outer layer 5 is generally 1 $g/m^2$, preferably 1.5 $g/m^2$, still more preferably 2 $g/m^2$, from the standpoint of layer formability at the time of coextrusion lamination.

Incidentally, it is without saying that the above-described basis weight values are those of the layers (outer layer 5, outermost layer 4 and intermediate layer 3) which are provided on one of the both sides of the foam layer 2.

The preferred physical properties of the laminated foam sheet 1 of the present invention will be next described.

Because of the incorporation of the polymeric antistatic agent in the intermediate layer 3, the laminated foam sheet 1 shows excellent antistatic property and is prevented from accumulating electrostatic charges and from being deposited with dust. The laminated foam sheet 1 preferably has a surface resistivity of $1 \times 10^{13} \Omega$ or less, more preferably $5 \times 10^{12} \Omega$ or less, still more preferably $3 \times 10^{12} 52$, or less, particularly preferably $1 \times 10^{12} \Omega$ or less. The lower limit of the surface resistivity is not specifically limited but is generally about $1 \times 10^7 \Omega$.

The surface resistivity of the laminated foam sheet 1 is measured according to JIS K6271(2001). More specifically, a test piece (having a length of 100 mm, a width of 100 mm and a thickness equal to that of the laminated foam sheet to be measured) is cut out from the laminated foam sheet and subjected to conditioning adjustment by being allowed to stand in an environment with a temperature of 23° C. and a relative humidity of 50%. Then the test piece is impressed with a voltage of 500 V and measured for the surface resistivity [$\Omega$] 1 minute after the commencement of the voltage impression.

The surface resistivity of the polymeric antistatic agent is also measured according to JIS K6271(2001). In this case, the polymeric antistatic agent is heat-pressed at a temperature of 200° C. to form a sheet having a thickness of about 0.1 mm. From the obtained sheet, a test piece is cut out and measured for the surface resistivity of the polymeric antistatic agent.

The laminated foam sheet 1 preferably has an apparent density of 15 to 300 $kg/m^3$ for reasons of good balance between its physical properties, such as strength, and its lightness in weight and cushioning property. From the above standpoint, the lower limit of the apparent density is more preferably 30 $kg/m^3$, still more preferably 40 $kg/m^3$, particularly preferably 50 kg/m³, while the upper limit of the apparent density is more preferably 200 kg/m³, still more preferably 170 kg/m³, particularly preferably 150 kg/m³.

The laminated foam sheet 1 preferably has a thickness of 0.05 to 2 mm, preferably 0.1 to 1.5 mm, still more preferably 0. 2 to 1.2 mm, for reasons of good balance between the cushioning property and flexibility thereof.

The laminated foam sheet 1 preferably has a basis weight of 5 to 100 g/m², more preferably 10 to 90 g/m² or less, still more preferably 20 to 80 g/m², for reasons of a balance between its lightness in weight and mechanical properties The thickness, basis weight and apparent density of the laminated foam sheet are measured as follows. A laminated foam sheet is cut vertically (namely, in the thickness direction) along the transverse direction (namely, in the direction normal to the extrusion direction) thereof to obtain a test piece having a width of 100 mm and a length equal to the transverse length of the laminated foam sheet. The test piece is measured for its thickness [mm] at every 1 cm interval in the transverse direction of the laminated foam sheet. The thickness [mm] of the laminated foam sheet is an arithmetic mean of the measured thickness values. The test piece is also measured for its weight [g]. The measured weight [g] is divided by its area [m²] (namely, 100 mm (0.1 m)×transverse length (m) of the laminated foam sheet). The obtained value with appropriate unit conversion represents the basis weight [g/m²] of the laminated foam sheet. The apparent density [kg/m³] of the laminated foam sheet is determined by dividing the basis weight [g/m²] thereof by the thickness [m] thereof (with appropriate unit conversion).

As used herein, the term "transverse" is intended to refer to a direction normal to the extrusion direction of the laminated foam sheet.

The basis weights of the intermediate layer 3 and outermost surface layer 4 may be determined from the thickness of each layer and the density of a resin composition that constitutes each layer. More specifically, a laminated foam sheet is vertically (in the thickness direction) cut along the transverse direction thereof and the vertical cross section is photographed at ten, transversely equally spaced apart positions. On each of the ten photographs (enlarged), the thickness of each of the intermediate layer and the outermost surface layer is measured at every 1 cm (true length) interval in the transverse direction thereof. The arithmetic mean of the ten measured thickness values of the intermediate layer and the arithmetic mean of the ten measured thickness values of the outermost layer represent the thickness of the intermediate layer and the outermost surface layer, respectively. The basis weights of the intermediate layer and the outermost surface layer may be calculated by multiplying their thicknesses by the densities of the resin compositions thereof with appropriate unit conversion. As used herein the term "resin composition" is intended to include not only the ethylene-based resin components but also other polymeric components and inorganic components used in respective layers.

Alternatively, the basis weight of each of the outermost surface layer and intermediate layer may be also determined on the basis of the extrusion rates thereof. More specifically, the basis weight C [g/m²] of the intermediate layer may be calculated by the following formula:

$$C = [1000X/(L \times W)]$$

wherein X represents an extrusion rate [kg/h] of the intermediate layer, L represents a drawing rate [m/h] of the laminated foam sheet and W represents the width (transverse length) [m] of the laminated foam sheet. The basis weight B [g/m²] of the outermost surface layer may be calculated by the following formula:

$$B = [1000Y/(L \times w)]$$

wherein Y represents an extrusion rate [kg/h] of the outermost surface layer and L and W are as defined above.

The laminated foam sheet of the present invention may be produced by any known method. One preferred method for producing a five-layer laminated foam sheet in which two, first and second intermediate layers are laminated on both sides of a foam layer, and two, first and second outermost surface layers are laminated on the first and second intermediate layers, respectively, includes providing a melt for forming the first intermediate layer, a melt for forming the second intermediate layer, a foamable melt for forming the foam layer, a melt for forming the first outermost surface layer, and a melt for forming the second outermost surface layer. These melts are then fed to a coextrusion die and laminated together. The laminated melts are extruded through the die to form a five-layer extrudate and to allow the layer of the foamable melt to foam and expand. In this case, the same melt may be commonly used for forming the first and second intermediate layers and the same melt may be commonly used for forming the first and second outermost surface layers.

In another preferred method for forming the five-layer laminated foam sheet, a melt for forming the first intermediate layer and a melt for forming the first outermost surface layer are laminated by coextrusion to obtain a first outer layer. Similarly, a melt for forming the second intermediate layer and a melt for forming the second outermost surface layer are laminated by coextrusion to obtain a second outer layer. These outer layers are laminated on both sides of a separately produced foam layer such that the first and second intermediate layers face the foam layer.

The coextrusion foaming process includes two different methods. One method uses a flat coextrusion die through which a sheet like laminate is extruded and foamed to obtain the intended laminated foam sheet. Another method uses a circular die through which a tubular laminate is extruded and foamed. The tubular extruded laminate is then drawn and enlarged over a mandrel and cut open to obtain the intended laminated foam sheet. Of these methods, the method using a circular die is preferred for reasons of easiness in producing a wide laminated foam sheet having a width (transverse length) of 1,000 mm or more.

A method for producing the laminated foam sheet by a coextrusion foaming process using a circular die will be next described in detail. The polyethylene-based resin PE-2 and, if necessary, one or more additives such as a cell controlling agent are fed to an extruder and heated and kneaded, into which a physical blowing agent is injected. The resulting mixture is further kneaded to obtain a foamable melt M-2 for forming the foam layer 2. At the same time, the polyethylene-based resin PE-3, polymeric antistatic agent and, if necessary, one or more additives are fed to another extruder and heated and kneaded to obtain a melt M-3 for forming the intermediate layer 3. Further, the polyethylene-based resin PE-4 and, if necessary, one or more additives are fed to a further extruder and heated and kneaded to obtain a melt M-4 for forming the outermost surface layer 4. The thus obtained melts M-2, M-3 and M-4 are fed to a circular coextrusion die and coextruded therethrough into the atmosphere and allowed to expand. The tubular extruded laminate is then drawn and enlarged over a mandrel and cut open to obtain the intended laminated foam sheet 1. It is without saying that when the outermost layer 4 and intermediate layer 3 provided on one side of the intended laminated foam sheet 1 respectively differ in composition from those provided on the other side thereof, it is necessary to use different kinds of melts for forming the different outermost layer 4 and intermediate layer 3.

It is preferred that the polyethylene-based resin PE-2 of the foam layer 2 has a melt flow rate (MFR) of 0.1 g/10 min to 20 g/10 min from the standpoint of foamability. When the foam layer 2, intermediate layer 3 and outermost surface layer layers 5 are laminated by coextrusion, it is preferred that each of the polyethylene-based resin PE-3 of the intermediate layer 3 and PE-4 of the outermost layer 4 has MFR that is equal to or greater than that of the polyethylene-based resin PE-2 of the foam layer from the standpoint of coextrusion efficiency. As used herein, the MFR is as measured according to JIS K7210-1(2014) at a temperature of 190° C. and a load of 2.16 kg.

It is preferred that a volatile plasticizer is contained in each of the melts M-3 and M-4 for forming the intermediate and outermost surface layers. As the volatile plasticizer, there may be preferably used a substance which has a function to lower the melt viscosity of the melts and which disappears by vaporization from the intermediate and outermost layers after the formation thereof. When the volatile plasticizer is incorporated into the melts M-3 and M-4 for forming the intermediate and outermost surface layers, the temperatures at which the respective melts are extruded can be made near the temperature at which the melt M-2 for forming the foam layer 2 is extruded (extrusion temperature lowering effect). Additionally, melt stretchability of each of the intermediate and outermost surface layers in a molten state is significantly improved (stretchability improving effect). Thus, because of the temperature lowering effect and stretchability improving effects, the cell structure of the foam layer 2 is not easily broken by the heat of the intermediate and outermost surface layers at the time of the coextrusion foaming and, further, the outer layer 5 (intermediate layer 3 and outermost surface layer 4) can be stretched following the foam layer 2 during the foaming stage.

The volatile plasticizer is preferably at least one selected from aliphatic and alicyclic hydrocarbons having 3 to 7 carbon atoms, aliphatic alcohols having 1 to 4 carbon atoms and aliphatic ether having 2 to 8 carbon atoms. When a low volatile substance such as a lubricant is used as the plasticizer, the low volatile plasticizer remains in the outer layer 5 and may stain a surface of an article to be wrapped or packaged. In contrast, the volatile plasticizer is preferable because it can efficiently plasticize the resins of the outer layer 5 and because it hardly remains in the obtained outer layer 5.

It is preferred that the volatile plasticizer has a boiling point of 120° C. or less, more preferably 80° C. or less for reasons of easy volatilization thereof from the outer layer 5. The volatile plasticizer which has a boiling point in the above range spontaneously volatilizes and disappears from the outer layer 5 after the fabrication of the laminated foam sheet 1. Namely, when the laminated foam sheet produced is allowed to stand in the atmosphere, the volatile plasticizer is spontaneously removed from the laminated foam sheet by the heat remaining therein after the extrusion foaming and by succeeding gas permeation at room temperature. The lower limit of the boiling point of the volatile plasticizer is about −50° C.

It is preferred that the volatile plasticizer is used in an amount of 5 to 50 parts by weight based on 100 parts by weight of a total amount of the polyethylene-based resin PE-3 and the polymeric antistatic agent in the case of the intermediate layer 3 or on 100 parts by weight of the polyethylene-based resin PE-4 in the case of the outermost layer 4.

One or more additives may be contained in each of the melts M-3 and M-4 for forming the intermediate and outermost surface layers to the extent that the object of the present invention is not adversely affected. Examples of the additives include an antioxidant, a heat stabilizer, a weathering stabilizer, a UV absorbing agent, a flame retardant, a filler and an antibacterial agent. The addition amount of the additive or additives may be suitably determined in view of the object and effect thereof but is preferably 10 parts by weight or less, more preferably 5 parts by weight or less, still more preferably 3 parts by weight or less, based on 100 parts by weight of the a total amount of the polyethylene-based resin PE-3 and the polymeric antistatic agent in the case of the intermediate layer 3 or on 100 parts by weight of the polyethylene-based resin PE-4 in the case of the outermost layer 4.

The physical blowing agent that is incorporated into the foamable melt M-2 for forming the foam layer 2 may be organic or inorganic physical blowing agent. As the organic physical blowing agent, there may be mentioned, for example, aliphatic hydrocarbons such as propane, n-butane, isobutane, n-pentane, isopentane, n-hexane and isohexane; alicyclic hydrocarbons such as cyclopentane and cyclohexane; chlorinated hydrocarbons such as methyl chloride and ethyl chloride; fluorinated hydrocarbons such as 1,1,1, 2-tetrafluoroethane and 1,1-difluoroethane. As the inorganic physical blowing agent, there may be mentioned, for example, nitrogen, carbon dioxide, air and water. These physical blowing agents may be used as a mixture of two or more thereof. If desired, a decomposition type blowing agent such as azodicarbonamide may be used. Above all, organic physical blowing agents, particularly those which contain as their major ingredient n-butane, isobutane or a mixture thereof, are preferred for reasons of their compatibility with the polyethylene-based resin and foamability.

The addition amount of the blowing agent is controlled in view of the kind of the blowing agent and the intended apparent density of the laminated foam sheet. When a mixed butane blowing agent, for example a mixture of 30% by weight of isobutane and 70% by weight of n-butane, is used as a physical blowing agent, the addition amount thereof is preferably 3 to 30 parts by weight, more preferably 4 to 20 parts by weight, more preferably 6 to 18 parts by weight, based on 100 parts by weight of the base polymer which consists of the polyethylene-based resin PE-2 and, when used, other resins and/or polymers.

Among the additives that are optionally added to the foamable melt M-2 for forming the foam layer 2, a cell controlling agent is particularly important. As the cell controlling agent, there may be used an inorganic or organic material. Examples of the inorganic cell controlling agent include metal salts of boric acid (such as zinc borate, magnesium borate and borax), sodium chloride, aluminum hydroxide, talc, zeolite, silica, calcium carbonate and sodium bicarbonate. Examples of the organic cell controlling agent include sodium 2,2-methylene-bis(4,6-di-t-butylphenyl)phosphate, sodium benzoate, calcium benzoate, aluminum benzoate and sodium stearate. Also usable as the cell controlling agent is of a sodium bicarbonate-citric acid-type that uses, for example, a combination of sodium bicarbonate with citric acid or a combination of sodium bicarbonate with an alkali metal salt of citric acid. These cell controlling agents may be used singly or in combination of two or more thereof. The amount of the cell controlling agent is preferably 0.01 to 3 parts by weight, more preferably 0.03 to 1 part by weight per 100 parts by weight of the base polymer resin.

The devices such as circular dies and extruders used for producing the laminated foam sheet may be those which are employed in the conventional extrusion foaming process.

The laminated foam sheet of the present invention has excellent cushioning property and antistatic property and is able to prevent transference of low molecular weight matters contained in the polymeric antistatic agent to an article to be wrapped or packaged with the sheet and, therefore, may be suited as an interleaf sheet for glasses and a packaging material for electronic devices.

The present invention will be next described by way of examples and comparative examples will further illustrate the present invention. The present invention is not limited to the examples below, however.

The polyethylene-based resin, polymeric antistatic agent and cell controlling agent used in Examples 1 to 7 and Comparative Examples 1 to 3 are as given below. Melt flow rate (MFR) is as measured according to JIS K7210-1(2014) at a temperature of 190° C. and a load of 2.16 kg. The melting point (MP) is a melting peak temperature measured according to the heat flux differential scanning calorimeter measurement based on JIS K7121 (1987) using conditions described in (2) and a heating rate of 10° C./min.
(1) Polyethylene-Based Resin (LDPE1):
Low-density polyethylene (Tradename "NUC8009" manufactured by NUC Corporation), Density: 917 kg/m$^3$, MFR: 9.0 g/10 min, MP: 107° C.
(2) Polyethylene-Based Resin (LLDPE1):
Linear low-density polyethylene (Tradename "NIPOLON LM55" manufactured by Toso Corporation), Density: 920 kg/m$^3$, MFR: 8.0 g/10 min, MP: 118° C.
(3) Polyethylene-Based Resin (LLDPE2):
Linear low-density polyethylene (Tradename "ULTZEX 2510OJ" manufactured by Prime Polymer Co., Ltd.), Density: 924 kg/m$^3$, MFR: 10.0 g/10 min, MP: 120° C.
Polymeric Antistatic Agent (ASP):
Polyether-polyolefin block copolymer (Tradename "PELECTRON LMP" manufactured by Sanyo Chemical Industries Ltd.), MFR: 17 g/10 min, MP: 117° C., Surface resistivity: $2.0 \times 10^7 \Omega$
Cell Controlling Agent:
Talc (Trade name "HI-Filler #12" manufactured by Matumura Sangyo Co., Ltd.)

The apparatus used for forming the laminated foam sheet is as follows. For forming a foam layer, a tandem extruder having a first extruder with a barrel inside diameter of 90 mm and a second extruder with a barrel inside diameter of 120 mm connected in series to the downstream side of the first extruder was used. For forming an intermediate layer, a third extruder with a barrel inside diameter of 50 mm was used. For forming an outermost surface layer, a fourth extruder with a barrel inside diameter of 40 mm was used. A coextrusion circular die having an outlet diameter of 94 mm was used for forming a laminated foam sheet.

Examples 1 to 7

To the first extruder were supplied the polyethylene-based resin PE-2 composed of 90% by weight of LDPE1 and 10% by weight of LLDPE1 and 1 part by weight of the cell controlling agent per 100 parts by weight of the polyethylene-based resin PE-2. The feeds were melted and kneaded at 200° C. in the first extruder, to which mixed butane (composed of 65 parts by weight of n-butane and 35 parts by weight of isobutane) as a physical blowing agent was injected in an amount of 11.5 parts by weight per 100 parts by weight of the polyethylene-based resin PE-2 and kneaded together. The kneaded mass was then fed to the second extruder connected downstream of the first extruder and adjusted at a resin temperature shown in Table 2 to obtain a melt M-2 for forming a foam layer. Similar melt M-2 was used in all Examples 1 to 7.

At the same time, the polyethylene-based resin PE-3 (the kind and amount are shown in Table 1) and the polymeric antistatic agent in an amount shown in Table 1 (20 parts by weight per 100 parts by weight of the total of the polyethylene-based resin PE3 and the polymeric antistatic agent) were supplied to the third extruder and melted and kneaded at a temperature of about 200° C. Then, the mixed butane (composed of 65 parts by weight of n-butane and 35 parts by weight of isobutane) as a volatile plasticizer was injected into the kneaded mass in the third extruder in an amount shown in Table 1 and kneaded together and adjusted to a resin temperature of shown in Table 2 to obtain a melt M-3 for forming an intermediate layer.

At the same time, the polyethylene-based resin PE-4 of the kind shown in Table 1 was fed in an amount shown in Table 1 to the fourth extruder and melted and kneaded at a temperature of about 200° C. Then, the mixed butane (composed of 65 parts by weight of n-butane and 35 parts by weight of isobutane) as a volatile plasticizer was injected into the kneaded mass in the fourth extruder in an amount shown in Table 2 and kneaded together and adjusted to a resin temperature of shown in Table 2 to obtain a melt M-4 for forming an outermost surface layer.

In the coextrusion circular die, the thus prepared melts M-2, M-3 and M-4 were introduced into separate tubular passageways at discharge rates shown in Table 2 and combined such that two tubular streams of the melt M-3 for forming the intermediate layers were laminated on inner and outer sides of the tubular stream of the foamable melt M-2 for forming the foam layer and, further, that two tubular streams of the melt M-4 for forming the outermost surface layer were laminated on respective outer sides of the tubular streams of the melt M-3. The combined streams were then coextruded and discharged through the coextrusion die into the atmosphere to obtain a tubular laminate foam product with a three-material, five-layer structure of (outermost surface layer)/(intermediate layer)/(foam layer)/(intermediate layer)/(outermost surface layer). The tubular laminate foam product was drawn, while being enlarged over a mandrel with an outer diameter of 360 mm, and cut open in the extrusion direction to obtain the laminate foam interleaf sheet having a width of 1,130 mm. The draw rate of the tubular laminate was adjusted as shown in Table 2 so that the basis weight of the laminate foam sheet was as shown in Table 3.

Remarks for Table 1:

*1: Melt M-3 for forming antistatic surface layer in the case of Comparative Example 1.

*2: Based on 100 parts by weight of the total of the polyethylene-based resin PE3 and the polymeric antistatic agent.

*3: Lamination of LDPE1 film by a thermal lamination method.

TABLE 1

| | Melt M-3 for Intermediate Layer *1 | | | Melt M-4 for Outermost Surface Layer | | |
|---|---|---|---|---|---|---|
| | Polyethylene-Based Resin PE-3 | | Polymeric Antistatic Agent | Volatile Plasticizer | Polyethylene-Based Resin PE-4 | | Volatile Plasticizer |
| | Kind | Amount [% by weight] | Amount [% by weight] | Amount *2 [part by weight] | Kind | Amount [% by weight] | Amount [part by weight] |
| Example 1 | LLDPE2 | 85 | 15 | 20 | LLDPE2 | 100 | 20 |
| Example 2 | LLDPE2 | 85 | 15 | 20 | LLDPE2 | 100 | 20 |
| Example 3 | LLDPE2 | 85 | 15 | 20 | LLDPE2 | 100 | 20 |
| Example 4 | LLDPE2 | 85 | 15 | 20 | LLDPE2 | 100 | 20 |
| Example 5 | LLDPE2 | 85 | 15 | 20 | LLDPE2 | 100 | 20 |
| Example 6 | LLDPE2 | 80 | 20 | 20 | LLDPE2 | 100 | 20 |
| Example 7 | LDPE1 | 85 | 15 | 20 | LDPE1 | 100 | 20 |
| Comparative Example 1 | LDPE1 | 85 | 15 | 20 | — | — | — |
| Comparative Example 2 | LDPE1 | 85 | 15 | 20 | LDPE1 *3 | 100 | — |
| Comparative Example 3 | LLDPE2 | 100 | 0 | 20 | LLDPE2 | 100 | 20 |

TABLE 2

| | Production Conditions | | | | | | |
|---|---|---|---|---|---|---|---|
| | Melt M-2 for Foam Layer | | Melt M-3 for Intermediate Layer | | Melt M-4 for Outermost Surface Layer | | |
| | Extruded Resin Temperature [° C.] | Discharge Rate [kg/hr] | Extruded Resin Temperature [° C.] | Discharge Rate kg/hr | Extruded Resin Temperature [° C.] | Discharge Rate kg/hr | Drawing Rate m/min |
| Example 1 | 112 | 60 | 123 | 18 | 117 | 13 | 34 |
| Example 2 | 112 | 60 | 117 | 10 | 117 | 13 | 20 |
| Example 3 | 112 | 60 | 116 | 5 | 118 | 19 | 20 |
| Example 4 | 112 | 60 | 123 | 18 | 117 | 13 | 20 |
| Example 5 | 112 | 60 | 116 | 10 | 116 | 5 | 34 |
| Example 6 | 112 | 60 | 123 | 18 | 117 | 13 | 20 |
| Example 7 | 112 | 60 | 116 | 14 | 116 | 18 | 34 |
| Comparative Example 1 | 112 | 60 | 117 | 10 | — | — | 34 |
| Comparative Example 2 | 112 | 60 | 117 | 10 | — | — | 34 |
| Comparative Example 3 | 112 | 60 | 123 | 18 | 117 | 13 | 34 |

Comparative Example 1

In the same manner as described in Examples 1 to 7, melt M-2 was prepared and used for forming a foam layer. The polyethylene-based resin PE-3 (the kind and amount are shown in Table 1) and the polymeric antistatic agent in an amount shown in Table 1 were supplied to the third extruder and melted and kneaded at a temperature of about 200° C. Then, the mixed butane (composed of 65 parts by weight of n-butane and 35 parts by weight of isobutane) as a volatile plasticizer was injected into the kneaded mass in the third extruder in an amount shown in Table 1 and kneaded together and adjusted to a resin temperature of shown in Table 2 to obtain a melt M-3 for forming an antistatic surface layer.

In the coextrusion circular die, the melts M-2 and M-3 were introduced into separate tubular passageways at feed rates shown in Table 2 and combined such that two tubular streams of the melt M-3 for forming the antistatic surface layers were laminated on inner and outer sides of the tubular stream of the foamable melt M-2 for forming the foam layer. The combined streams were then coextruded and discharged through the coextrusion die into the atmosphere to obtain a tubular laminate foam product with a two-material, three-layer structure of (antistatic surface layer)/(foam layer)/(antistatic surface layer). The tubular laminate foam product was drawn, while being enlarged over a mandrel with an outer diameter of 360 mm, and cut open in the extrusion direction to obtain the laminate foam interleaf sheet having a width of 1,130 mm. The draw rate of the tubular laminate was adjusted so that the basis weight of the laminate foam sheet was as shown in Table 3.

Comparative Example 2

A three-material, five-layer laminated foam sheet was produced by thermal lamination rather than coextrusion lamination. A film having a thickness of 25 μm was prepared using LDPE1. The obtained film was laminated by thermal lamination on both sides of the three layer laminated foam sheet obtained in Comparative Example 1 to obtain a tubular laminate foam product with a three-material, five-layer structure of (outermost surface layer)/(intermediate layer)/(foam layer)/(intermediate layer)/(outermost surface layer).

Comparative Example 3

Example 1 was repeated in the same manner as described except that the polymeric antistatic agent was not added to the melt M-3 for forming the intermediate layer.

Each of the laminated foam sheets obtained in Examples 1 to 7 and Comparative Examples 1 to 3 was measured for various physical properties. The results are shown in Table 3. The antistatic property and transference preventing property of the laminated foam sheets were also evaluated to give the results shown in Table 4.

of the five test pieces. Each test piece was also measured for its weight [g]. The measured weight was divided by its area [$m^2$] to obtain the basis weight [$g/m^2$] of the test piece. The basis weight [$g/m^2$] of the laminated foam sheet is an arithmetic mean of those of the five test pieces. The apparent density [$kg/m^3$] of the laminated foam sheet was determined by dividing the basis weight [$kg/m^2$] thereof by an arithmetic mean of the thickness [m] of the five test pieces (with appropriate unit conversion).

(2) Basis Weight of the Outermost Surface Layer and Intermediate Layer, and Thickness of the Outer Layer:

The basis weight of each of the outermost surface layer and intermediate layer was determined on the basis of the

TABLE 3

| Laminated Foam Sheet | | | Basis Weight C (Intermediate Layer) [$g/m^2$] | Basis Weight B (Outermost Surface Layer) [$g/m^2$] | Basis Weight (Outer Layer) (B + C) [$g/m^2$] | B/C ratio | Amount A of Polymeric Antistatic Agent [$g/m^2$] | B/A ratio |
|---|---|---|---|---|---|---|---|---|
| | Apparent Density [$kg/m^3$] | Thickness [mm] | Basis Weight [$g/m^2$] | | | | | |
| Example 1 | 89 | 0.47 | 42 | 4 | 3 | 7 | 0.75 | 0.60 | 5.0 |
| Example 2 | 75 | 0.83 | 62 | 4 | 5 | 9 | 1.25 | 0.60 | 8.3 |
| Example 3 | 75 | 0.84 | 63 | 2 | 7 | 9 | 3.50 | 0.30 | 23.3 |
| Example 4 | 73 | 0.96 | 70 | 7 | 5 | 12 | 0.71 | 1.05 | 4.8 |
| Example 5 | 106 | 0.32 | 34 | 2 | 1 | 3 | 0.50 | 0.30 | 3.3 |
| Example 6 | 66 | 1.04 | 69 | 7 | 5 | 12 | 0.71 | 1.40 | 3.6 |
| Example 7 | 71 | 0.58 | 41 | 3 | 4 | 7 | 1.33 | 0.45 | 8.9 |
| Comparative Example 1 | 120 | 0.25 | 30 | 2 | 0 | 2 | — | 0.30 | 0.0 |
| Comparative Example 2 | 267 | 0.30 | 80 | 2 | 25 | 27 | — | 0.30 | 83.3 |
| Comparative Example 3 | 100 | 0.41 | 41 | 4 | 3 | 7 | 0.75 | 0.00 | — |

TABLE 4

| | Antistatic property | | Transference preventing property | | |
|---|---|---|---|---|---|
| | Surface | | Haze | | Contact angle |
| | resistivity [Ω] | Evaluation | Difference [%] | Evaluation | Evaluation |
| Example 1 | $2.0 \times 10^{11}$ | excellent | 1.39 | excellent | excellent |
| Example 2 | $1.6 \times 10^{12}$ | excellent | 1.19 | excellent | excellent |
| Example 3 | $4.0 \times 10^{12}$ | good | 0.25 | excellent | excellent |
| Example 4 | $2.1 \times 10^{11}$ | excellent | 0.99 | excellent | excellent |
| Example 5 | $8.3 \times 10^{11}$ | excellent | 1.49 | excellent | good |
| Example 6 | $1.7 \times 10^{10}$ | excellent | 1.25 | excellent | good |
| Example 7 | $2.3 \times 10^{11}$ | excellent | 1.48 | excellent | fair |
| Comparative Example 1 | $6.0 \times 10^{11}$ | excellent | 2.81 | no good | fair |
| Comparative Example 2 | $>1.0 \times 10^{16}$ | no good | 1.20 | excellent | good |
| Comparative Example 3 | $>1.0 \times 10^{16}$ | no good | 1.58 | good | excellent |

The measurement and evaluation of the physical properties shown in Table 3 and Table 4 were carried out as follows.

(1) Apparent Density, Basis Weight and Thickness of the Laminated Foam Sheets:

A laminated foam sheet was vertically cut in the transverse direction to obtain five test pieces each having a width of 100 mm and a length equal to the transverse length of the laminated foam sheet. Each test piece was measured for its thickness [mm] at every 1 cm interval in the transverse direction of the laminated foam sheet. The thickness [mm] of the laminated foam sheet is an arithmetic mean of those extrusion rates thereof. More specifically, the basis weight B [$g/m^2$] of the outermost surface layer was calculated by the following formula:

$$B = [1000Y/(L \times w)]$$

wherein Y represents an extrusion rate [kg/h] of the outermost surface layer, L represents a drawing rate [m/h] of the laminated foam sheet and W represents the transverse length [m] of the laminated foam sheet. The basis weight C [$g/m^2$] of the intermediate layer was calculated by the following formula:

$$C = [1000X/(L \times W)]$$

wherein X represents an extrusion rate [kg/h] of the intermediate layer, and L and W are as defined above.

The basis weight of the outer layer was determined as a sum of the basis weight of the intermediate layer and that of the outermost surface layer. Incidentally, Examples 1 to 7 and Comparative Examples 1 to 3 were each carried out under such conditions that the outermost layer of one of the two outer layers had the same basis weight as that of the other one of the outer layers and the intermediate layer of one of the two outer layers had the same basis weight as that of the other one of the outer layers. Thus, only the basis weights B and C of one of the two outer layers are shown in Table 3.

(3) Antistatic Property (Surface Resistivity):

Three test pieces, each having a length of 100 mm, a width of 100 mm and a thickness equal to that of the laminated foam sheet thickness were cut out from locations near the both transverse ends and near the center in the transverse direction of the laminated foam sheet. Then, in accordance with the method of JIS K6271 (2001), each of the test pieces was placed in an environment with a temperature of 23° C. and a relative humidity of 50% and impressed with a voltage of 500 V. The surface resistivity of each test piece was measured 1 minute after the commencement of the voltage impression. The measurement was carried out on each of the both surfaces of each of the three test pieces. The surface resistivity of the laminated foam sheet is an arithmetic mean of the six measured values. As the measurement instrument, Model TR8601 manufactured by Takeda Riken Industry Co., Ltd. was used.

On the basis of the surface resistivity thus measured, the antistatic property of the laminated foam sheet was evaluated based on the following criteria:

Excellent: surface resistivity is $3.0 \times 10^{12}$ 0 or lower
Good: surface resistivity is higher than $3.0 \times 10^{12}$ 0 or less and $1.0 \times 10^{13}$ 0 or lower
No good: surface resistivity is higher than $1.0 \times 10^{13}$ 0

(4) Transference Preventing Property:

For the purpose of measuring transference of low molecular weight matters contained in the laminated foam sheet to a glass surface, haze and contact angle were measured.

(4-1) Haze:

Preclean slide glass manufactured by Matsunami Glass Industries, Ltd. was used as a material to be in direct contact with the laminated foam sheet. Ten sheets of the slide glasses were stacked one over the other to obtain a stack of ten glass sheets. This stack was measured for its haze value (H0 [%]) in the thickness direction (stacking direction) of the laminate using a haze meter (Model NDH2000 manufactured by Nippon Denshoku Industries Co., Ltd.). Next, one side of each of ten sheets of the similar slide glasses was press-contacted with the laminated foam sheet at a pressure of 3.8 g/cm² and then allowed to quiescently stand as such in an environment maintained at a temperature of 60° C. and a relative humidity of 90% for 24 hours. Then, the laminated foam sheets were removed and the remaining ten sheets of the slide glass were stacked one over the other. The glass stack was measured for its haze value (H1 [%]) in the same manner as above. A difference (H1−H0) between the glass haze values before and after the contact with the laminated foam sheet was calculated. The smaller the difference (H1−H0), the lower is the transference of low molecular weight matters contained in the antistatic agent in the laminated foam sheet to the slide glass. The transference preventing property is rated as follows:

Excellent: the difference is less than 1.5%
Good: the difference is 1.5% or more and less than 2.0%
Fair: the difference is 2.0% or more and less than 2.5%
No good: the difference is 2.5% or more (4-2) Contact Angle:

Preclean slide glass manufactured by Matsunami Glass Industries, Ltd. was used as a material to be in direct contact with the laminated foam sheet. The slide glass was measured for its contact angle (C0 [degree]) by a droplet method according to JIS R3257-1999 using a contact angle meter (Model DM500R manufactured by Kyowa Interface Science Co., Ltd.). Next, similar slide glass was press-contacted with the laminated foam sheet at a pressure of 3.8 g/cm² and then allowed to quiescently stand as such in an environment maintained at a temperature of 60° C. for 24 hours. Then, the laminated foam sheet was removed and the remaining slide glass was measured for its contact angle (C1 [degree]) in the same manner as above. A difference (C1−C0) between the contact angle values before and after the contact with the laminated foam sheet was calculated. The smaller the difference (C1−C0), the lower is the transference of low molecular weight matters contained in the polyethylene resin in the laminated foam sheet to the slide glass. The transference preventing property is rated as follows:

Excellent: the difference is less than 15 degrees
Good: the difference is 15 degrees or more and less than 20 degrees
Fair: the difference is 20 degrees or more and less than 25 degrees
No good: the difference is 25 degrees or more The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A laminated foam sheet comprising:
  a foam layer of a base polymer including a polyethylene-based resin (PE-2), and
  an outer layer laminated on each of both sides of the foam layer,
  each of the outer layers having a multi-layer structure comprising an outermost surface layer containing a polyethylene-based resin (PE-4) and an intermediate layer containing a polyethylene-based resin (PE-3) and positioned between the outermost surface layer and the foam layer,
  the outermost surface layer and the intermediate layer of each of the outer layers being laminated together by coextrusion,
  the outermost surface layer of each of the outer layers being substantially free of a polymeric antistatic agent and having a basis weight B of 0.5 to 10 g/m²,
  the intermediate layer of each of the outer layers containing a polymeric antistatic agent in an amount of 10 to 30% by weight based on the total weight of the polyethylene-based resin (PE-3) and the polymeric antistatic agent,
  wherein the polymeric antistatic agent is contained in the intermediate layer of each of the outer layers in an amount A that is 0.2 to 2 g/m² of the intermediate layer,
  wherein the laminated foam sheet has a surface resistivity of $1 \times 10^7 \Omega$ or more and less than $1 \times 10^{12} \Omega$, and wherein, in each of the outer layers, a ratio B/A of the basis weight B of the outermost surface layer to the amount A g/m²1 of the polymeric antistatic agent is 2 to 30.

2. The laminated foam sheet according to claim 1, wherein the intermediate layer of each of the outer layers has a basis weight C of 1 to 10 g/m².

3. The laminated foam sheet according to claim 1, wherein the polyethylene-based resin (PE-4) of the outermost surface layer of each of the outer layers is linear low-density polyethylene.

4. The laminated foam sheet according to claim 1, wherein the polyethylene-based resin (PE-3) of the intermediate layer of each of the outer layers is linear low-density polyethylene.

5. The laminated foam sheet according to claim 1, wherein the laminated foam sheet has an apparent density of 15 to 300 kg/m³ and a basis weight of 5 to 70 g/m².

6. The laminated foam sheet according to claim 1, wherein the laminated foam sheet has a surface resistivity of $1\times10^7 \Omega$ or more and $8.3\times10^{11} \Omega$ or less.

* * * * *